US009413409B2

(12) United States Patent
Black et al.

(10) Patent No.: US 9,413,409 B2
(45) Date of Patent: Aug. 9, 2016

(54) METHOD AND APPARATUS FOR TUNING AN ANTENNA BASED ON UNRELIABLE DATA

(71) Applicant: Google Technology Holdings LLC, Mountain View, CA (US)

(72) Inventors: Gregory R. Black, Vernon Hills, IL (US); Robert S. Trocke, Caledonia, WI (US)

(73) Assignee: Google Technology Holdings LLC, Mountain View, CA (US)

( * ) Notice: Subject to any disclaimer, the term of this patent is extended or adjusted under 35 U.S.C. 154(b) by 238 days.

(21) Appl. No.: 13/873,557

(22) Filed: Apr. 30, 2013

(65) Prior Publication Data

US 2014/0273886 A1 Sep. 18, 2014

Related U.S. Application Data

(60) Provisional application No. 61/789,780, filed on Mar. 15, 2013.

(51) Int. Cl.

| | |
|---|---|
| ***H04B 1/04*** | (2006.01) |
| ***H04B 1/3827*** | (2015.01) |
| ***H04W 52/28*** | (2009.01) |
| ***H04W 52/36*** | (2009.01) |

(52) U.S. Cl.

CPC ............ *H04B 1/3838* (2013.01); *H04B 1/0458* (2013.01); *H04W 52/283* (2013.01); *H04W 52/367* (2013.01)

(58) Field of Classification Search

CPC . H04B 1/3838; H04W 52/283; H04W 52/367

See application file for complete search history.

(56) References Cited

U.S. PATENT DOCUMENTS

| | | | | |
|---|---|---|---|---|
| 8,204,446 | B2 | 6/2012 | Scheer et al. | |
| 2004/0176125 | A1* | 9/2004 | Lee | 455/522 |
| 2005/0075123 | A1* | 4/2005 | Jin et al. | 455/522 |
| 2007/0238496 | A1* | 10/2007 | Chung et al. | 455/575.7 |
| 2011/0105023 | A1* | 5/2011 | Scheer et al. | 455/41.2 |
| 2012/0071195 | A1* | 3/2012 | Chakraborty et al. | 455/522 |
| 2012/0077538 | A1* | 3/2012 | Yun | 455/522 |
| 2012/0206556 | A1* | 8/2012 | Yu et al. | 348/14.02 |
| 2012/0214412 | A1* | 8/2012 | Schlub et al. | 455/41.1 |
| 2012/0220243 | A1* | 8/2012 | Mendolia | 455/77 |

FOREIGN PATENT DOCUMENTS

| | | | |
|---|---|---|---|
| EP | 1298809 | A2 | 4/2003 |
| EP | 2487967 | A2 | 8/2012 |
| WO | WO 2012/177939 | A2 | 12/2012 |

OTHER PUBLICATIONS

European Patent Office, International Search Report and the Written Opinion in International Patent Application PCT/US2014/018564 (Jun. 18, 2014).

* cited by examiner

*Primary Examiner* — David Bilodeau

(74) *Attorney, Agent, or Firm* — Wolfe-SBMC

(57) ABSTRACT

A method and apparatus for tuning an antenna of a communication device includes receiving, at a processing element within the communication device, data relevant to tuning the antenna and identifying an unreliable portion of the data. The method also includes identifying, based on the unreliable portion of the data, a first set of tuning states for tuning the antenna, wherein the first set of tuning states is a subset of a plurality of possible tuning states for tuning the antenna. The method further includes restricting tuning of the antenna to tuning states within the first set of tuning states.

46 Claims, 6 Drawing Sheets

300

| | | | | | | | | |
|---|---|---|---|---|---|---|---|---|
| ~~$Z_{11}$~~ | ~~$Z_{12}$~~ | ~~$Z_{13}$~~ | ~~$Z_{14}$~~ | ~~$Z_{15}$~~ | $Z_{16}$ | $Z_{17}$ | $Z_{18}$ | $Z_{19}$ |
| ~~$Z_{21}$~~ | ~~$Z_{22}$~~ | ~~$Z_{23}$~~ | ~~$Z_{24}$~~ | $Z_{25}$ | $Z_{26}$ | $Z_{27}$ | $Z_{28}$ | ~~$Z_{29}$~~ |
| ~~$Z_{31}$~~ | ~~$Z_{32}$~~ | ~~$Z_{33}$~~ | $Z_{34}$ | $Z_{35}$ | $Z_{36}$ | $Z_{37}$ | ~~$Z_{38}$~~ | ~~$Z_{39}$~~ |
| ~~$Z_{41}$~~ | ~~$Z_{42}$~~ | $Z_{43}$ | $Z_{44}$ | $Z_{45}$ | $Z_{46}$ | ~~$Z_{47}$~~ | ~~$Z_{48}$~~ | ~~$Z_{49}$~~ |
| ~~$Z_{51}$~~ | $Z_{52}$ | $Z_{53}$ | $Z_{54}$ | $Z_{55}$ | ~~$Z_{56}$~~ | ~~$Z_{57}$~~ | ~~$Z_{58}$~~ | ~~$Z_{59}$~~ |
| $Z_{61}$ | $Z_{62}$ | $Z_{63}$ | $Z_{64}$ | ~~$Z_{65}$~~ | ~~$Z_{66}$~~ | ~~$Z_{67}$~~ | ~~$Z_{68}$~~ | ~~$Z_{69}$~~ |

| Transceiver State | Sub-Band 1 | Sub-Band 2 | Sub-Band 3 | Sub-Band 1 | Sub-Band 2 | Sub-Band 3 | Sub-Band 1 | Sub-Band 2 | Sub-Band 3 | Sub-Band 1 | Sub-Band 2 | Sub-Band 3 | Sub-Band 1 | Sub-Band 2 | Sub-Band 3 |
|---|---|---|---|---|---|---|---|---|---|---|---|---|---|---|---|
| Transmission Favored | $L_{11}$ | $L_{12}$ | $L_{13}$ | $R_{11}$ | $R_{12}$ | $R_{13}$ | $H_{11}$ | $H_{12}$ | $H_{13}$ | $B_{11}$ | $B_{12}$ | $B_{13}$ | $F_{11}$ | $F_{12}$ | $F_{13}$ |
| Balanced | $L_{21}$ | $L_{22}$ | $L_{23}$ | $R_{21}$ | $R_{22}$ | $R_{23}$ | $H_{21}$ | $H_{22}$ | $H_{23}$ | $B_{21}$ | $B_{22}$ | $B_{23}$ | $F_{21}$ | $F_{22}$ | $F_{23}$ |
| Reception Favored | $L_{31}$ | $L_{32}$ | $L_{33}$ | $R_{31}$ | $R_{32}$ | $R_{33}$ | $H_{31}$ | $H_{32}$ | $H_{33}$ | $B_{31}$ | $B_{32}$ | $B_{33}$ | $F_{31}$ | $F_{32}$ | $F_{33}$ |
| Application State | Left-Hand Position | | | Right-Hand Position | | | Head-and-Hand Position | | | Body Position | | | Free-Space Position | | |

FIG. 4

METHOD AND APPARATUS FOR TUNING AN ANTENNA BASED ON UNRELIABLE DATA

FIELD OF THE DISCLOSURE

The present disclosure relates generally to tunable antennas and more particularly to identifying tuning states for communication devices in the presence of unreliable data.

BACKGROUND

As market demand drives the evolution of portable communication devices, such as smartphones and two-way radios, engineering limitations determine the rate of progress. New innovation is required to support a next-generation of communication devices that offer improved functionality. A particular area in which progress can be made in the state of the art is in better managing the specific absorption rate (SAR) associated with communication devices. SAR is a measure of the amount of radio frequency energy absorbed by the body when using such devices. Currently, the maximum SAR level allowed by the Federal Communications Commission (FCC) is 1.6 watts per kilogram.

Because of their small form factor, portable communication devices today typically have small antennas that are completely enclosed within the devices' outer shell. As a result, more of a user's body covers the antenna when the device is held in user-proximal positions, such as in the hand or against the user's head. In these positions, the increased area of exposure translates into the user's body intercepting a greater amount of transmitted energy while the antenna is radiating. The current solution is to use sensor and application data to determine when the communication device is in a user-proximal position and then to cut back on the transmitted power level to reduce SAR. A difficulty presents itself, however, when the data used to ascertain the user's body position is no longer trustworthy. This is the case when data processing related to the radio frequency (RF) subsystem is performed by an application processor that is unlocked. When the processor is unlocked, the user has the ability to "tweak" or alter previously secure hardware and/or software associated with the processor—in some cases with the goal of looking for a performance gain.

Existing communication devices employ a maximum cutback of the transmitted power level when the application processor is unlocked. Once the application processor is unlocked, the power is cut back all the time. When the data concerning the user's body position is no longer reliable, the power level needs to be low enough to ensure that SAR will be within tolerance for every possible position. While this "worst-case-scenario" method works, it comes at the price of unnecessarily diminished performance.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 3 is a schematic diagram of tuning states eliminated from a set of possible tuning states in accordance with some embodiments of the present teachings.

FIG. 4 is a look-up table of possible tuning states for advanced open-loop tuning in accordance with some embodiments of the present teachings.

Figure 1:
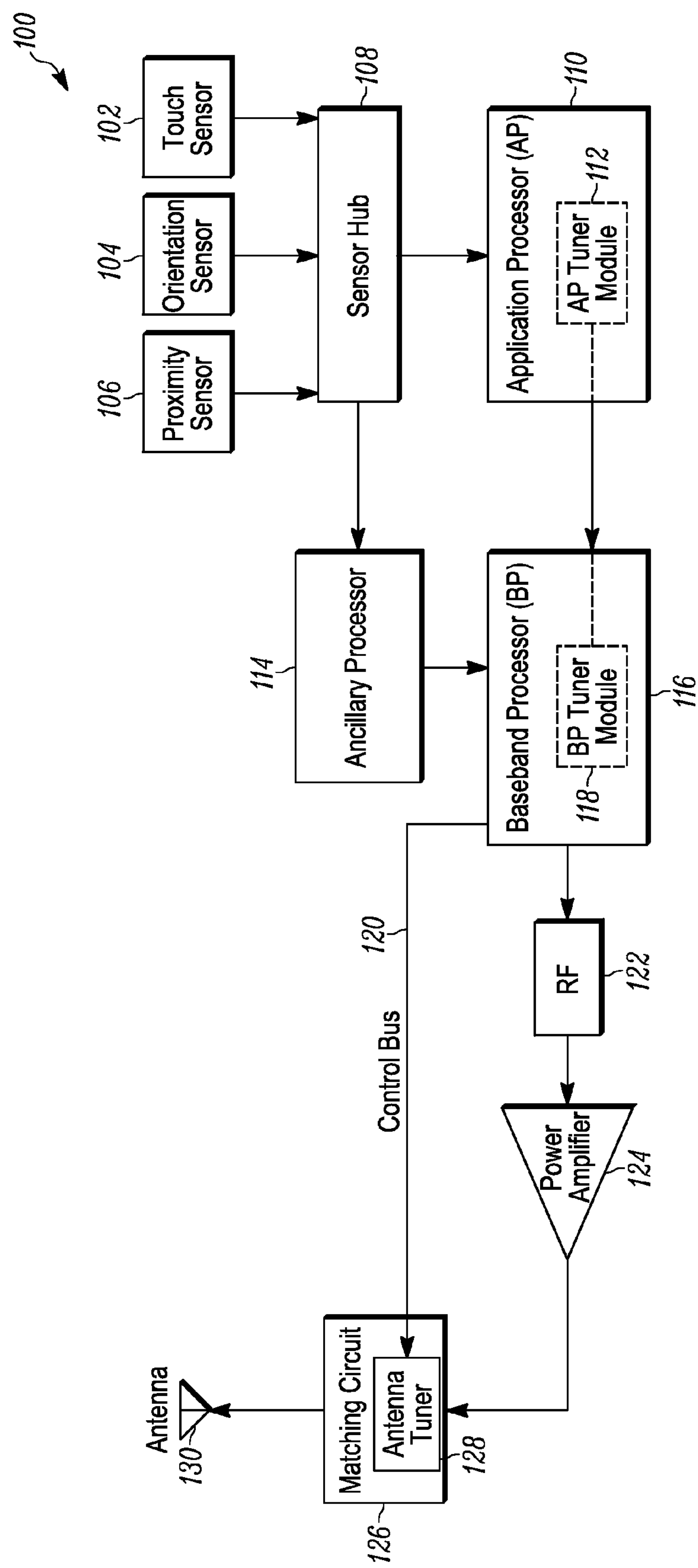
FIG. 1 is a block diagram of a communication device with a tunable antenna in accordance with some embodiments of the present teachings.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to the various embodiments, the present disclosure provides a method and apparatus for tuning an antenna of a communication device to manage SAR, or more specifically, to reduce, limit, or control SAR when data relevant to tuning the antenna is identified as unreliable. A communication device, as used herein, is defined to be a device capable of wirelessly transmitting voice or non-voice data, in either a digital or analog format. Examples of communication devices include, but are not limited to: cellular phones, smartphones, push-to-talk radios, two-way radios, telephone handsets, network-capable game consoles, and wearable or "body-borne" computers. Because a communication device uses an electromagnetic wave to transmit data, it is the source of radio frequency energy that can cause an SAR that exceeds a maximum acceptable rate in a person or persons in proximity to the device. When data relevant to determining a tuning state for the communication device is identified as unreliable, embodiments of the present teachings provide for tuning the antenna to mitigate SAR.

In accordance with the teachings herein, a method performed by a communication device for tuning an antenna comprises: receiving, at a processing element within the communication device, data relevant to tuning the antenna; identifying an unreliable portion of the data; and identifying, based on the unreliable portion of the data, a first set of tuning states for tuning the antenna, wherein the first set of tuning states is a subset of a plurality of possible tuning states for tuning the antenna.

Also in accordance with the teachings herein is an apparatus for tuning an antenna of a communication device comprising a tunable antenna and a first processing element configured to: receive a first set of data relating to a status of the communication device; and generate, based on the first set of data, a second set of data applicable to tuning the antenna. The apparatus further comprises a second processing element, coupled to the first processing element and the tunable antenna, wherein the second processing element is configured to: receive the second set of data; identify at least a portion of the second set of data as unreliable; and modify, based on the unreliable portion of the second set of data, a set of possible tuning states.

For a particular embodiment, the first processing element is an application processor and the second processing element is a baseband processor. The apparatus further comprises an ancillary processor, coupled to the baseband processor, wherein the ancillary processor is configured to generate a third set of data applicable to tuning the antenna and communicate the third set of data to the baseband processor. The baseband processor is further configured to modify the set of possible tuning states by determining, based on the second and third sets of data and based on the unreliable portion of the second set of data, a subset of tuning states from the set of possible tuning states.

Further in accordance with the teachings herein is a method, performed by a communication device, for tuning an antenna. The method comprises determining that an application processor within the communication device is unlocked and restricting tuning of the antenna to a set of default tuning states.

Referring now to the drawings, and in particular FIG. 1, a tuning system (also referred to herein as "the system") implementing elements in accordance with the present disclosure is shown and indicated generally at 100. In one embodiment, system 100 is included within a communication device (also referred to herein as "the device") to tune an antenna of the communication device in order to transmit information.

As shown, system 100 comprises: a touch sensor 102, an orientation sensor 104, a proximity sensor 106, a sensor hub 108, an application processor (AP) 110, an ancillary processor 114, a baseband processor (BP) 116, a control bus 120, an RF source 122, a power amplifier 124, a matching circuit 126 that includes an antenna tuner 128, and an antenna 130. Additionally, the AP 110 and the BP 116 are shown to comprise an AP tuner module 112 and a BP tuner module 112, respectively, which in an embodiment, are logical indications of functionality performed by the AP 110 and the BP 116 in accordance with the present teachings. Although not explicitly shown, the ancillary processor 114 within system 100 also comprises a tuner module for some embodiments.

For various embodiments, the aforementioned tuner modules 112, 118 can operate collectively or independently of one another to achieve the functionality described herein. In one embodiment, each tuner module performs an algorithm that is implemented in hardware, and may be further implemented in software and/or firmware, as design parameters dictate, to perform elements of the teachings herein, for instance, as described by reference to FIGS. 2-6.

Only a limited number of system elements 102-110, 114, 116, 120-130 are shown at 100 for ease of illustration, but additional such elements may be included in the system 100. Moreover, other elements needed for a commercial embodiment of a communication device that incorporates the tuning system 100 are omitted from FIG. 1 for clarity in describing the enclosed embodiments. For example, such other elements can include, but are not limited to, memory devices, RF receiver components, etc.

We now turn to a brief description of the elements within the system 100. In general, the AP 110, the ancillary processor 114, the BP 116, the matching circuit 126, and the antenna tuner 128 are configured with functionality in accordance with embodiments of the present disclosure as described in detail below with respect to the remaining FIGS. 2-6. "Adapted," "operative" or "configured," as used herein, means that the indicated elements are implemented using one or more hardware devices such as one or more operatively coupled processing elements, memory devices, and interfaces, which may or may not be programmed with software and/or firmware as the means for the indicated elements to implement their desired functionality. Such functionality is supported by the other hardware shown in FIG. 1, including the system elements 106-108, 122, 124, and 130.

Continuing now with the brief description of the system elements shown at 100, as included within a communication device. The three sensors 102-106 gather sensor data by taking specific measurements that describe the physical state of the communication device and its immediate surroundings. The touch sensor 102 registers contact made with the communication device, and the resulting data is used to determine the position of the communication device relative to a user's body. The user, for example, might hold the communication device (e.g., a cellular phone) in his left or right hand in a "left-hand" or "right-hand position," respectively, between his head and hand as he presses the device to his ear in a "head-and-hand position," or in a case worn against his hip in a "body position." In a particular embodiment, the touch sensor 102 uses capacitive sensors to detect anything contacting the communication device that is conductive or has a dielectric constant different than that of air. By distributing larger numbers of capacitive sensors throughout a housing of the communication device, user positions can be determined with greater accuracy.

In alternate embodiments, the touch sensor 102 utilizes pressure sensitive areas of the phone and photo sensors to measure the user's contact points with the communication device. Where pressure sensitive areas are used, a change in pressure is recorded as a portion of the user's body is pressed up against such an area. For photo sensors, contact by the user blocks the light received by the sensors.

A proximal presence to the communication device that does not involve actual contact is registered by the proximity sensor 106, or alternatively by a capacitive sensor. In one embodiment, the proximity sensor 106 uses light-emitting diodes (LEDs) as a source of infrared light, which is reflected by proximal objects and recorded by the sensor. In another embodiment, a camera within the communication device is used to perform the function of the proximity sensor 106.

The orientation sensor indicated at 104 provides measurements of how the communication device is orientated in one or more spatial dimensions. In an embodiment, it can do this by using accelerometers in combination with magnetic-field sensors. In a position assumed by the communication device while the user is texting, for example, the orientation sensor determines that the device is held with its front face up inclined relative to the ground at an angle of between 40 and 50 degrees while the horizontal component of its longitudinal axis is pointing in a south-easterly direction. While only three sensors 102-106 are explicitly shown at 100, alternate embodiments can use different numbers and types of sensors in different combinations.

The sensor hub 108 comprises hardware assistance and dedicated computational resources for the sensors 102-106. It also performs real-time data collection, which includes grouping and formatting data received from the sensors 102-106 prior to communicating that data to the AP 110 and/or the ancillary processor 114.

The AP 110 represents the main data-processing element within the communication device. It performs tasks, other than control functions, that include running the operating system of the communication device and supporting applications that run in the operating system environment. The AP 110 processes application- and hardware-related data, which includes data associated with the status of the communication device and data relevant to tuning the antenna 130. The AP 110 additionally processes any sensor data it receives from the sensor hub 108. In an embodiment, application- and hardware-related data is grouped with sensor data and processed before being communicated to the BP 116 for use in determining tuning states of the antenna 130.

The ancillary processor 114 represents one or more processing cores, separate from the AP 110, that in some embodiments also receive or generate data relevant to tuning the antenna 130. In an embodiment, the ancillary processor 114 runs applications and controls hardware independently of the AP 110. In a further embodiment, a portion of the sensor data not communicated to the AP 110 is received by the ancillary processor 114. In yet another embodiment, the ancillary processor 114 receives a subset or portion of the sensor data provided to the AP 110.

The BP 116 is a processing element that manages the radio functions of the communication device, such as signal modulation, encoding, frequency shifting, and transceiver state, for example. In some embodiments, however, WiFi and/or Bluetooth® are managed by another processing element. The BP 116 also makes a final determination as to which tuning states to use for tuning the antenna 130. These tuning states are communicated to the antenna tuner 128 within the matching circuit 126 over the control bus 120 implementing a control-bus standard. In a particular embodiment, the implemented control-bus standard is the Mobile Industry Processor Interface (MIPI) Alliance Radio-Frequency Front-End (RFFE) Control Interface, as specified by the MIPI Alliance Specification for RFFE Version 1.00.00-3, dated May 2010, or any subsequent releases. In another embodiment, the control bus comprises a Serial Peripheral Interface (SPI) bus.

The matching circuit 126 applies the tuning states it receives from the BP 116 over the control bus 120. In an embodiment, the matching circuit 126 accomplishes this by using electronics comprising both passive and active circuit components. Adjustable elements of the matching circuit 126 are represented by the antenna tuner shown at 128. It is these adjustable elements, that can include resistors, capacitors, and/or inductors, that provide the means by which the matching circuit 126 implements tuning states. Adjustable elements are defined to include both individually adjustable circuit components, such as a potentiometer, or collectively adjustable circuit components, such as a bank of metal-oxide semiconductor (MOS) capacitors that are controlled by independently activated switches. For a particular embodiment, the matching circuit 126 receives the tuning state from the BP 116 as a code, such as a binary code, which provides individual settings for the adjustable elements within the antenna tuner 128.

The RF element 122 receives a baseband signal from the BP 116 and creates a modulated analog signal, which it provides to the power amplifier 124. The power amplifier 124 amplifies the modulated analog signal to provide an RF signal to the matching circuit 126. The matching circuit 126, using the antenna tuner 128, imposes the tuning state, and the antenna 130 transmits the RF signal.

Figure 2:
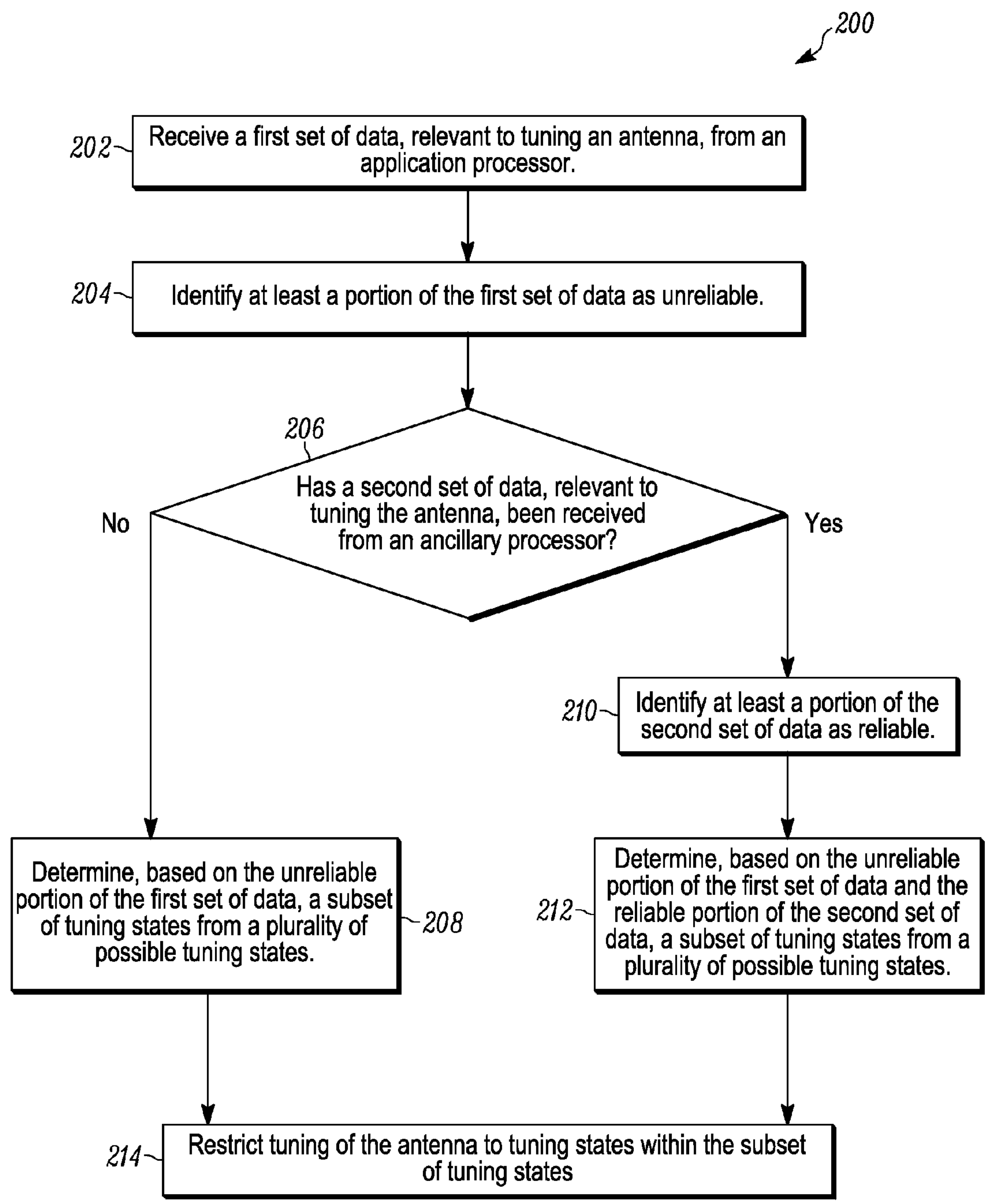
FIG. 2 is a flow diagram of a method for tuning an antenna in accordance with some embodiments of the present teachings.

We turn now to a detailed description of the functionality of the elements 100 shown in FIG. 1, in accordance with the teachings herein and by reference to the remaining figures. FIG. 2 is a logical flow diagram illustrating a method 200 performed by the communication device for tuning the antenna 130. More particularly, at 202, a second processing element receives from a first processing element, a first set of data relevant to tuning an antenna. For some embodiments, the second processing element is the BP 116. In one embodiment, and for purposes of describing the remaining functionality illustrated in FIG. 2, the first processing element is the AP 110. However, in an alternative embodiment, the first processing element is any processor within the communication device that includes a tuner module and supplies to the BP 116 a set of data relevant to tuning the antenna, including but not limited to the ancillary processor 114. As defined herein, a set of data can include only a single datum or can include a plurality of data.

Data relevant to tuning the antenna 130 is data from which information about a tuning state for the antenna 130 can be inferred or derived. For example, data suggesting that a user's body is or is not in a certain position relative to the antenna 130 provides information about a tuning state for the antenna 130 because the antenna's impedance is affected by the user's body position. Continuing with the example, the following information inferred from data relevant to tuning the antenna 130 suggests that the user is not holding the communication device (e.g., a cellular phone) in a head-and-hand position: the communication device is not in a voice call, a modem for the communication device is aware of occasional data bursts; a web browser application is open and active on the communication device; the touch sensor 102 detects that the communication device is being gripped at its left and right edges like a game controller; a sliding keyboard for the communication device is exposed; and an audio earpiece for the communication device is not active. Conversely, data that indicates a state opposite that described above would suggest that the communication device is being held in the head-and-hand position and that the antenna 130 should be tuned accordingly.

At 204, the BP 116 identifies at least a portion of the first set of data as unreliable. At least a portion of a set of data being unreliable is defined to mean that either the entire set of data is unreliable or a subset of the set of data is unreliable. Reliable data is data representing the true state of the device that has not been replaced or modified by a user of the device or a software component. Unreliable data is data received from hardware within the device that possibly reflects a state of the device other than the true state of the device.

In one embodiment, identifying at least a portion of the first set of data as unreliable comprises determining that at least one authenticated file associated with a processor other than a baseband processor has been modified or replaced. In another embodiment, identifying at least a portion of the first set of data as unreliable comprises determining that the processing element from which the data was received is unlocked. For example, with respect to an embodiment where the processing element receiving data relevant to tuning the antenna 130 is a baseband processor and at least some of the data relevant to tuning the antenna 130 is received from a processor within the communication device other than the baseband processor, identifying the unreliable portion of the data comprises determining that the processor other than the baseband processor is unlocked.

A processing element that is locked is secured against having its hardware parameters changed from their nominal design values and also secured so that authenticated files used or run by the processing element cannot be modified or replaced. An unlocked processing element, by contrast, is defined herein to be a processing element which allows a user to alter its physical parameters and/or allows the user to modify or replace files used or run by the processing element.

In a first embodiment, the processing element within the communication device receiving the first set of data from the AP 110 determines that the AP 110 is unlocked by identifying an e-fuse associated with the AP 110 has been "tripped" or "blown." In second embodiment, the determination that the AP 110 is unlocked is made by identifying physical parameters of the AP 110 that no longer match their nominal design values.

There may be instances where an unlocked processing element can still be considered as a source of reliable data, but the BP 116 nonetheless uses some other means to identify a portion of the data as unreliable. In other instances, the processing element may be locked but some of its data is still considered unreliable due to other factors. This can be the case, for example, when the locked processing element receives data from another processing element that is unlocked.

In a particular embodiment, identifying at least a portion of a set of data as unreliable comprises determining that the AP 110, whether locked or unlocked, is running or transmitting a file that has replaced an authenticated file or that is an unauthorized and/or modified version of an authenticated file. For example, it might be the case that a boot loader run by the AP 110 is no longer trusted because it is not signed or there is an encryption key mismatch, such that the code cannot be authenticated, indicating the software was modified or replaced by the user. In essence, the validity of unreliable data cannot be guaranteed. It is data that may or may not provide accurate information relevant to tuning the antenna 130.

In another embodiment, the same data may or may not be considered reliable depending upon the source from which it was received. A charging status, for example, is trusted information if plugging in the charger triggers an electrical signal that has a physical path through the device. If, however, the charging status is sensed or routed through an unlocked AP 110, the information is no longer trustworthy.

At 206, the BP 116 determines if a second set of data has been received from an additional processor within the communication device. In a particular embodiment, the additional processor is the ancillary processor shown in FIG. 1 at 114. If a second data set is not received, the BP 116 determines, at 208, based on the unreliable portion of the first set of data, a subset of tuning states from a plurality of possible tuning states.

The plurality of possible tuning states represents a set of tuning states from which a single tuning state is chosen and implemented depending upon the status of the communication device and upon information relevant to tuning the antenna 130 that is inferred from the first and possibly the second set of received data. Assuming the first and second data sets provide reliable information that the communication device is being held in the head-and-hand position and assuming further that the communication device is transmitting on a sub-band of a specific frequency, a tuning state within the plurality of possible tuning states is the correct tuning state for the antenna 130. Likewise, the correct tuning states for the antenna 130 in other possible scenarios are also represented by the plurality of possible tuning states.

The antenna 130 has an impedance that is dependent upon its transmission frequency and also upon the user's relative body position, which affects the resonant frequency of the antenna 130. The antenna 130 transmits most effectively when its standing wave ratio (SWR) is minimized or when a larger portion of the energy supplied to the antenna 130 is transmitted rather than reflected back toward the communication device. This state can be imposed by matching the impedance of the antenna 130 to a transmitter within the device, which is further known in the art as complex conjugate impedance matching. Tuning the antenna 130 is optimizing the match in response to varying conditions or an operating mode. Tuning is performed using the variable elements in the antenna tuner 128. The tuning state is correlated to the parameters needed for the antenna tuner 128 to tune the antenna 130.

When data relevant to tuning the antenna 130 is unreliable, information used to tune the antenna 130, such as the user's relative position, may not be accurate. If the antenna 130 is tuned in accordance with this unreliable data, there is a potential for a mismatch that can cause an undesirable condition, a condition, for example, where the user of the communication device is exposed to higher-than-expected SAR. By removing tuning states from the plurality of possible tuning states that could potentially cause undesirable conditions due to unreliable information, a subset of tuning states is left that minimizes or eliminates such undesirable conditions.

Turning momentarily to FIG. 3, a schematic diagram representing the elimination of tuning states from a set of possible tuning states is shown and indicated at 300. Particularly, FIG. 3 shows a 6-by-9 array of complex impedance values ($Z_{mn}=R_{mn}+jX_{mn}$) in an open-loop-style lookup table. Together, the 54 values represent the set of possible tuning states. By eliminating 30 of the values as indicated, a subset of tuning states is defined by the remaining 24 states.

Returning to FIG. 2 at 214, tuning of the antenna 130 is restricted to the subset of tuning states determined at 208. Although the actual status and/or relative user position for the antenna 130 is partially or completely indeterminate, each tuning state in the subset of tuning states, when implemented, results in an SAR equal to or lower than the actual impedance-matching tuning state had it been known. The condition of lower SAR for the subset of tuning states is ensured by laboratory testing during the design phase of the communication device.

For an embodiment, the subset of tuning states comprises a tuning state other than a user-proximal tuning state. A user-proximal tuning state is defined as a tuning state that is implemented to match the impedance of the antenna 130 to its transmitter and minimize SWR when reliable data accurately determines the antenna 130 is in a user-proximal position. A user-proximal position, in turn, is a position in which the user's body is either in contact with the communication device or in close enough proximity to it to appreciably affect the impedance of its antenna 130. In a further embodiment, the tuning state other than a user-proximal tuning state comprises a free-space tuning state.

In a simplified example, we consider both the head-and-hand position, where the user holds the communication device to his ear, and a free-space user position, defined as a position where no obstacle or portion of the user's body is in close enough proximity to the antenna 130 to appreciably affect its impedance. If the correct position can be inferred from reliable data, the correct impedance-matching tuning state is selected from the two possible tuning states and implemented. If, however, the correct position cannot be determined because at least a portion of the data is unreliable, the head-and-hand tuning state is eliminated in favor of the free-space tuning state. If, fortuitously, the communication device happens to be in the free-space position, then the free-space tuning state is the optimal impedance-matching tuning state.

The head-and-hand position has the potential of being more problematic because the user's body is proximal to the antenna 130 where it can absorb a greater amount of transmitted radio-frequency energy. Implementing the free-space tuning state, however, results in an impedance mismatch in the head-and-hand position. This impedance mismatch means that more radio-frequency energy is reflected and less is transmitted (higher SWR), resulting in lower SAR for the user.

In an embodiment, tuning states in the subset of tuning states result in a lower SAR in a user-proximal position than the remaining tuning states in the set of possible tuning states, which are excluded from the first set of tuning states. In another embodiment, the subset of tuning states comprises a tuning state that results in a lower SAR in a user-proximal position than a user-proximal tuning state in the user-proximal position, which is verified by laboratory testing.

For a particular embodiment, the BP 116 also identifies a reliable portion of the first set of data (in addition to the unreliable portion), and based on the reliable portion of the data, identifies a second set of tuning states for tuning the antenna 130, wherein the second set of tuning states is a subset of the plurality of possible tuning states for tuning the antenna 130, and the second set of tuning states includes the first set of tuning states. The BP 116 then restricts tuning of the antenna 130 to tuning states within the second set of tuning states.

For the following example, the tuning states of the antenna 130 are restricted based on data that is only in part unreliable. A second processing element of the communication device receives a first set of data relevant to tuning the antenna 130 from a first processing element of the communication device. The first set of data can comprise application data and/or sensor data. For a particular embodiment, the second processing element is the BP 116, and the first processing element is a processor other than the BP 116. In a further embodiment, the processor other than the BP 116 is the AP 110 and/or the ancillary processor 114.

Upon receiving the first set of data, the second processing element determines that some of the data of the first set of data is reliable and some of it is unreliable. For example, the second processing element identifies from a reliable portion of the first set of data that a voice call is active on the communication device, and that the device is being held in a vertical orientation. Because this information is inferred from reliable data, it is treated as accurate and used in some embodiments to modify the set of possible tuning states even when another portion of the data is unreliable.

The second processing element, however, is unable to accurately determine the user's head position and hand placement from the unreliable portion of the first set of data. In a particular embodiment, the unreliable data itself is not used by the second processing element to modify the set of possible tuning states, but the type of data is. For example, the second processing element may identify from unreliable data that the communication device is being held in a left-hand position. An assumed, and possibly incorrect, left-hand position for the communication device is information that is not used by the second processing element to modify the set of possible tuning states. The fact that the hand position is indeterminate, however, is used to modify the set of possible tuning states by eliminating specific tuning states that could cause high SAR in any particular hand position.

The second processing element is configured to modify a set of possible tuning states and to restrict tuning of the antenna 130 to tuning states within the modified set of possible tuning states. In one embodiment, the modified set of possible tuning states comprises a subset of the set of possible tuning states. In another embodiment, the modified set of possible tuning states comprises tuning states that are not used when all data received by the second processor relevant to tuning the antenna 130 is reliable in its entirety. When the second processing element receives only reliable data, for example, parameters related to tuning the antenna 130 are definite and the correct impedance-matching tuning state is included in and selected from the current set of possible tuning states. When the second processing element receives unreliable data, however, some of the parameters are indeterminate. Laboratory tests conducted during the design and testing phase of the communication device might suggest a default tuning state is best for managing SAR in this case. In one embodiment, a single default tuning state is used. In another embodiment, the default tuning state implemented depends on which portion of the data received by the second processing element is identified as unreliable.

After determining that some of the data is reliable and some of the data is unreliable, the second processing element restricts tuning states of the antenna to free-space tuning states. Which of the free-space tuning states is implemented depends, for instance, on which sub-band is used and which transceiver state is favored, as illustrated by reference to FIG. 4. In a particular embodiment, the free-space tuning state is a default tuning state that is selected when the second processing element has access to insufficient reliable data to otherwise determine a tuning state. For one embodiment, the set of default tuning states is associated with standing wave ratios that exceed standing wave ratios of user-proximal tuning states.

If a second data set is received from the ancillary processor 114 at 206, the BP 116 identifies at least a portion of the second set of data as reliable at 210. In a particular embodiment, the sensor hub 108 is coupled to both the AP 110 and the ancillary processor 114, which may or may not be locked. The AP 110 receives sensor data for running games and other applications, while the ancillary processor 114 receives separate sensor data that relates, at least in part, to the tuning the antenna 130. At 212, the BP 116 determines, based on the unreliable portion of the first set of data received from the AP 110 and the reliable portion of the second set of data received from the ancillary processor 114, a subset of tuning states from a plurality of possible tuning states. For a particular embodiment, the subset of tuning states determined at 212 is a superset to the subset of tuning states determined at 208. This is because the reliable portion of data from the second set of data provides additional information relevant to tuning the antenna, such as the user's relative position, that makes the status of the device less indefinite. Therefore, fewer tuning states are eliminated from the plurality of possible tuning states. At 214, tuning states of the antenna 130 are restricted to the subset of tuning states determined at 212.

FIG. 4 shows an advanced open-loop look-up table of possible tuning states in accordance with some embodiments of the present teachings. In particular, FIG. 4 shows five 3-by3 arrays of tuning states, each associated with a specific user position. The array designated by the letter "H," for example, represents tuning states for the head-and-hand position. The first, second, and third columns of each array provide the tuning states for the first, second, and third sub-band, respectively, used by the communication device. Only three sub-bands are indicated for ease of illustration. The first, second, and third rows of each array provide the transmission-favored, balanced, and reception-favored tuning states for each user position, respectively. Because of the channel separation between the transmission and reception frequency, each user position is associated with tuning states that accommodate a specific transceiver state. For open-loop tuning, the possible tuning states are discrete, tabulated values, or determined from such values, using interpolation, extrapolation, or an equation, for example.

In an embodiment where a balanced tuning state is needed for the second sub-band, the BP 116 implements the tuning state $B_{22}$ where a reliable portion of the data it receives relevant to tuning the antenna 130 indicates that the communication device is in a body position. Where the user position cannot be determined with accuracy due to unreliable data, the BP 116 instead implements tuning state $F_{22}$ as a default tuning state.

In addition to advanced open-loop tuning, the teachings herein are also applicable to embodiments utilizing closed-loop tuning. For closed-loop tuning, the matching circuit 126 monitors SWR, for example, to search for a best-matched tuning state that minimizes the amount of RF energy reflected by the antenna 130 on a specific domain. In one embodiment, the plurality of possible tuning states is represented by a searchable multi-dimensional first parameter space, and the first set of tuning states, which in an embodiment is the modified set of possible tuning states, is represented by a searchable second parameter space contained within the first parameter space.

Figure 5:
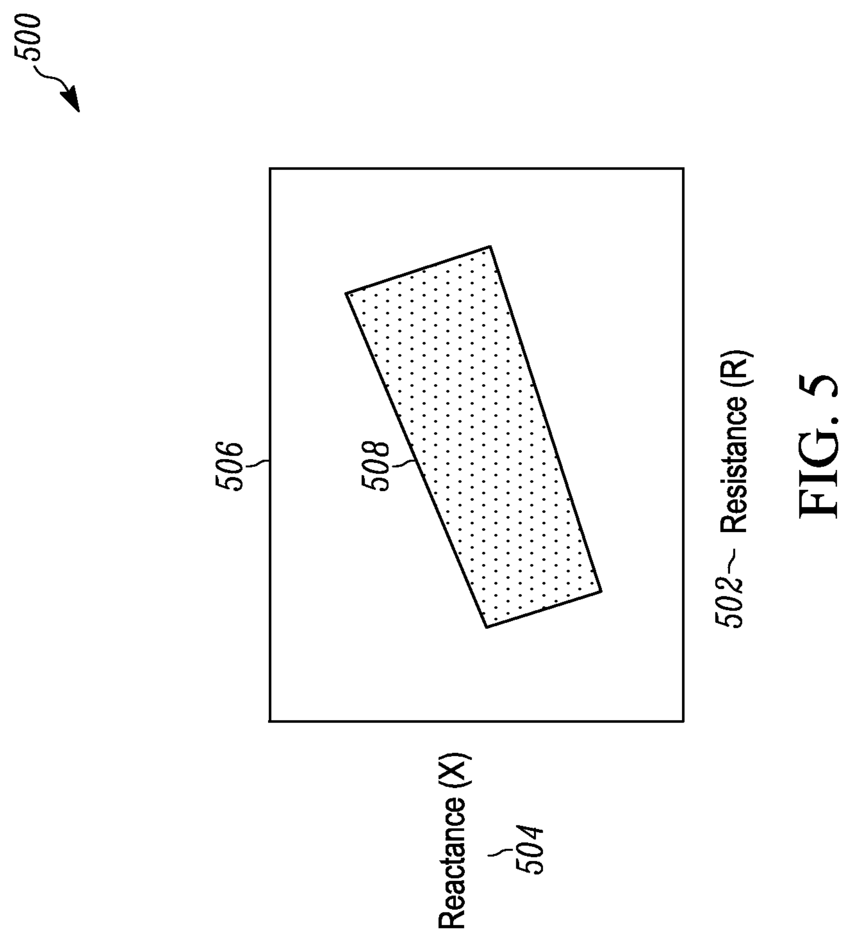
FIG. 5 is a schematic diagram of searchable parameter spaces for closed-loop tuning in accordance with some embodiments of the present teachings.
Figure 6:
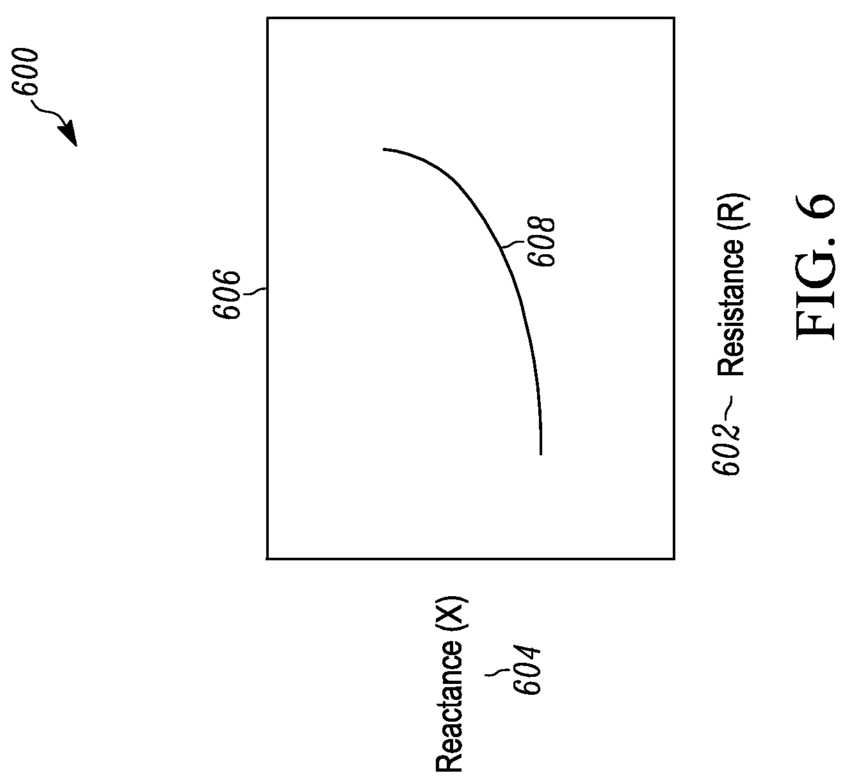
FIG. 6 is a schematic diagram of searchable parameter spaces for closed-loop tuning in accordance with some embodiments of the present teachings.

FIG. 5 shows a schematic diagram at 500 of searchable parameter spaces for closed-loop tuning in accordance with some embodiments of the present teachings. In particular, FIG. 5 shows a first searchable parameter space at 506 that represents a plurality of possible tuning states. Each point of the area 506 represents a complex impedance that can be searched and implemented as a tuning state. On the horizontal axis, the real part of the impedance is shown as a resistance at 502. On the vertical axis, the imaginary part of the impedance is shown as a reactance at 504. The impedance of tuning states for closed-loop tuning are determined from continuous rather than discrete values.

If the data relevant to tuning the antenna 130 received by the BP 116 is reliable, the BP 116 allows the matching circuit 126 to search the entire first parameter space 506 for a best-matched tuning state that maximizes the power delivered to the antenna 130. If, however, a portion of the data received by the BP 116 is unreliable, the BP 116 restricts the domain on which the matching circuit 126 searches to the second parameter space indicated at 508. As shown, the second parameter space 508 is completely internal to the first parameter space 506. Effectively, the BP 116 is limiting tuning states of the antenna 130 in the presence of unreliable information to a subset of the plurality of possible tuning states. The eliminated tuning states are represented by the portion of the first parameter space 506 that falls outside the second parameter space 508. The eliminated tuning states are those that could potentially cause unfavorable conditions (e.g., high SAR) if they were implemented.

In another embodiment, in which tuning the antenna 130 comprises complex-conjugate impedance matching, the first parameter space is a two-dimensional space and the second parameter space is a trajectory within the two-dimensional space. This embodiment is illustrated by the schematic diagram shown in FIG. 6 at 600. The first two-dimensional parameter space is shown at 606 and carries the same labels of resistance 602 and reactance 604 on its real and imaginary axis, respectively, as shown in FIG. 5. When all the data relevant to tuning received by the BP 116 is reliable, the matching circuit 126 is allowed to search the entire first parameter space 606 for a best-matched tuning state. If a portion of the data is unreliable, however, the BP 116 restricts the tuning states that can be implemented by allowing the matching circuit 126 to only search for a best-matched tuning state on the second parameter space represented by the trajectory 608. For some embodiments, restricting the matching circuit 126 to search on a second parameter space of lesser dimension than the first parameter space has an added benefit of allowing the matching circuit 126 to more quickly find a best-matched tuning state.

In further embodiments, the second searchable parameter spaces 508 and 608 can extend beyond the boundaries of the first parameter spaces 506 and 606, respectively, or they can fall completely outside the boundaries of the first parameter spaces 506 and 606, respectively. The second parameter spaces 508, 608 being entirely excluded from the first parameter spaces 506, 606, respectively, is analogous to the modified set of possible tuning states including default tuning states that are only implemented when data relevant to tuning is unreliable, either in part or in whole, and not when the data is completely reliable.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method, performed by a communication device, for tuning an antenna, the method comprising:

receiving, at a processing element within the communication device, data relevant to tuning the antenna;

identifying an unreliable portion of the data, the identifying including determining that a processor within the communication device other than the processing element is unlocked; and identifying, based on the unreliable portion of the data, a first set of tuning states for tuning the antenna, the first set of tuning states is a subset of a plurality of possible tuning states for tuning the antenna.

2. The method of claim 1 further comprising restricting tuning of the antenna to tuning states within the first set of tuning states.

3. The method of claim 1, wherein:

the processing element receiving data relevant to tuning the antenna is a baseband processor; and at least some of the data relevant to tuning the antenna is received from the processor within the communication device other than the baseband processor.

4. The method of claim 1, wherein:

the processing element receiving data relevant to tuning the antenna is a baseband processor; and identifying the unreliable portion of the data comprises determining that at least one authenticated file associated with the processor other than a baseband processor has been modified or replaced.

5. The method of claim 1, wherein the first set of tuning states comprises a tuning state other than a user-proximal tuning state.

6. The method of claim 5, wherein the tuning state other than a user-proximal tuning state comprises a free-space tuning state.

7. The method of claim 1, wherein tuning states in the first set of tuning states result in a lower specific absorption rate in a user-proximal position than the remaining tuning states in the set of possible tuning states.

8. The method of claim 1, wherein the first set of tuning states comprises a tuning state that results in a lower specific absorption rate in a user-proximal position than a user-proximal tuning state in the user-proximal position.

9. The method of claim 1 further comprising:

identifying a reliable portion of the data; identifying, based on the reliable portion of the data, a second set of tuning states for tuning the antenna, wherein the second set of tuning states is a subset of the plurality of possible tuning states for tuning the antenna, and the second set of tuning states includes the first set of tuning states; and restricting tuning of the antenna to tuning states within the second set of tuning states.

10. The method of claim 1, wherein the plurality of possible tuning states is represented by a searchable multi-dimensional first parameter space, and the first set of tuning states is represented by a searchable second parameter space contained within the first parameter space.

11. The method of claim 10, wherein tuning the antenna comprises complex-conjugate impedance matching, and wherein the first parameter space is a two-dimensional space and the second parameter space is a trajectory within the two-dimensional space.

12. The method of claim 1, wherein the determining that the processor within the communication device other than the processing element is unlocked comprises identifying that the processor allows a user to alter its physical parameters.

13. The method of claim 1, wherein the determining that the processor within the communication device other than the processing element is unlocked comprises identifying that the processor allows a user to modify one or more files that are used or run by the processor.

14. The method of claim 1, wherein the determining that the processor within the communication device other than the processing element is unlocked comprises identifying that the processor allows a user to replace one or more files that are used or run by the processor.

15. The method of claim 1, wherein the determining that the processor within the communication device other than the processing element is unlocked comprises identifying that a fuse associated with the processor has been tripped or blown.

16. The method of claim 1, wherein the determining that the processor within the communication device other than the processing element is unlocked comprises identifying that at least one physical parameter of the processor does not match a nominal design value for the physical parameter.

17. The method of claim 1, wherein the identifying the unreliable portion of the data further includes determining that at least one authenticated file associated with the processor has been modified or replaced.

18. The method of claim 1, wherein the identifying the unreliable portion of the data further includes determining that the processor is running or transmitting an unauthorized file.

19. The method of claim 18, wherein the determining that the processor is running or transmitting an unauthorized file comprises:

determining that the processor is running or transmitting a file that does not include a signature; or determining that the processor is running or transmitting a file that includes an invalid encryption key.

20. An apparatus for tuning an antenna of a communication device, the apparatus comprising:

a tunable antenna;

a first processing element configured to:

receive a first set of data relating to a status of the communication device; and generate, based on the first set of data, a second set of data applicable to tuning the antenna; and a second processing element, coupled to the first processing element and the tunable antenna, the second processing element is configured to:

receive the second set of data;

identify at least a portion of the second set of data as unreliable, the identifying including determining that a processor within the communication device other than the second processing element is unlocked; and modify, based on the unreliable portion of the second set of data, a set of possible tuning states.

21. The apparatus of claim 20, wherein the second processing element is configured to modify the set of possible tuning states by determining a subset of tuning states from the set of possible tuning states based on the unreliable portion of the second set of data, and wherein the second processing element is further configured to restrict tuning of the antenna to tuning states within the subset of tuning states.

22. The apparatus of claim 20, wherein the first processing element is the processor within the communication device other than the second processing element and the second processing element is a baseband processor.

23. The apparatus of claim 22, wherein an ancillary processor, coupled to the baseband processor, wherein the ancillary processor is configured to:

generate a third set of data applicable to tuning the antenna; and communicate the third set of data to the baseband processor, wherein the baseband processor is further configured to modify the set of possible tuning states by determining, based on the second and third sets of data and based on the unreliable portion of the second set of data, a subset of tuning states from the set of possible tuning states.

24. The apparatus of claim 20, wherein the first set of data comprises application data.

25. The apparatus of claim 20, wherein the first set of data comprises sensor data.

26. The apparatus of claim 20, wherein the determining that the processor within the communication device other than the second processing element is unlocked comprises identifying that the processor allows a user to alter its physical parameters.

27. The apparatus of claim 20, wherein the determining that the processor within the communication device other than the second processing element is unlocked comprises identifying that the processor allows a user to modify one or more files that are used or run by the processor.

28. The apparatus of claim 20, wherein the determining that the processor within the communication device other than the second processing element is unlocked comprises identifying that the processor allows a user to replace one or more files that are used or run by the processor.

29. The apparatus of claim 20, wherein the determining that the processor within the communication device other than the second processing element is unlocked comprises identifying that a fuse associated with the processor has been tripped or blown.

30. The apparatus of claim 20, wherein the determining that the processor within the communication device other than the second processing element is unlocked comprises identifying that at least one physical parameter of the processor does not match a nominal design value for the physical parameter.

31. The apparatus of claim 20, wherein the second processing element is further configured to identify at least a portion of the second set of data as unreliable by determining that at least one authenticated file associated with the first processing element has been modified or replaced.

32. The apparatus of claim 20, wherein the second processing element is further configured to identify at least a portion of the second set of data as unreliable by determining that the first processing element is running or transmitting an unauthorized file.

33. The apparatus of claim 27, wherein the determining that the first processing element is running or transmitting an unauthorized file comprises:

determining that the first processing element is running or transmitting a file that does not include a signature; or determining that the first processing element is running or transmitting a file that includes an invalid encryption key.

34. A method, performed by a communication device, for tuning an antenna, the method comprising:

determining that an application processor within the communication device is unlocked; and restricting tuning of the antenna to a set of default tuning states.

35. The method of claim 34, wherein the set of default tuning states is associated with standing wave ratios that exceed standing wave ratios of user-proximal tuning states.

36. The method of claim 35, wherein the set of default tuning states comprises a free-space tuning state.

37. The method of claim 34, wherein the restricting tuning of the antenna to a set of default tuning states is performed in response to determining that the application processor within the communication device is unlocked.

38. The method of claim 34, wherein the determining that the application processor within the communication device is unlocked comprises identifying that the application processor allows a user to alter its physical parameters.

39. The method of claim 34, wherein the determining that the application processor within the communication device is unlocked comprises identifying that the application processor allows a user to modify one or more files that are used or run by the application processor.

40. The method of claim 34, wherein the determining that the application processor within the communication device is unlocked comprises identifying that the application processor allows a user to replace one or more files that are used or run by the application processor.

41. The method of claim 34, wherein the determining that the application processor within the communication device is unlocked comprises identifying that a fuse associated with the application processor has been tripped or blown.

42. The method of claim 34, wherein the determining that the application processor within the communication device is unlocked comprises identifying that at least one physical parameter of the application processor does not match a nominal design value for the physical parameter.

43. The method of claim 34, further comprising:

receiving, from the application processor and at a processor within the communication device other than the application processor, data relevant to tuning the antenna; and identifying an unreliable portion of the data in response to the determining that the application processor within the communication device is unlocked.

44. The method of claim 34, further comprising:

receiving, from the application processor and at a processor within the communication device other than the application processor, data relevant to tuning the antenna; and identifying an unreliable portion of the data by determining that at least one authenticated file associated with the application processor has been modified or replaced.

45. The method of claim 34, further comprising:

receiving, from the application processor and at a processor within the communication device other than the application processor, data relevant to tuning the antenna; and identifying an unreliable portion of the data by determining that the application processor is running or transmitting an unauthorized file.

46. The method of claim 45, wherein the determining that the processor is running or transmitting an unauthorized file comprises:

determining that the processor is running or transmitting a file that does not include a signature; or determining that the processor is running or transmitting a file that includes an invalid encryption key.

* * * * *